United States Patent Office 3,383,909
Patented May 21, 1968

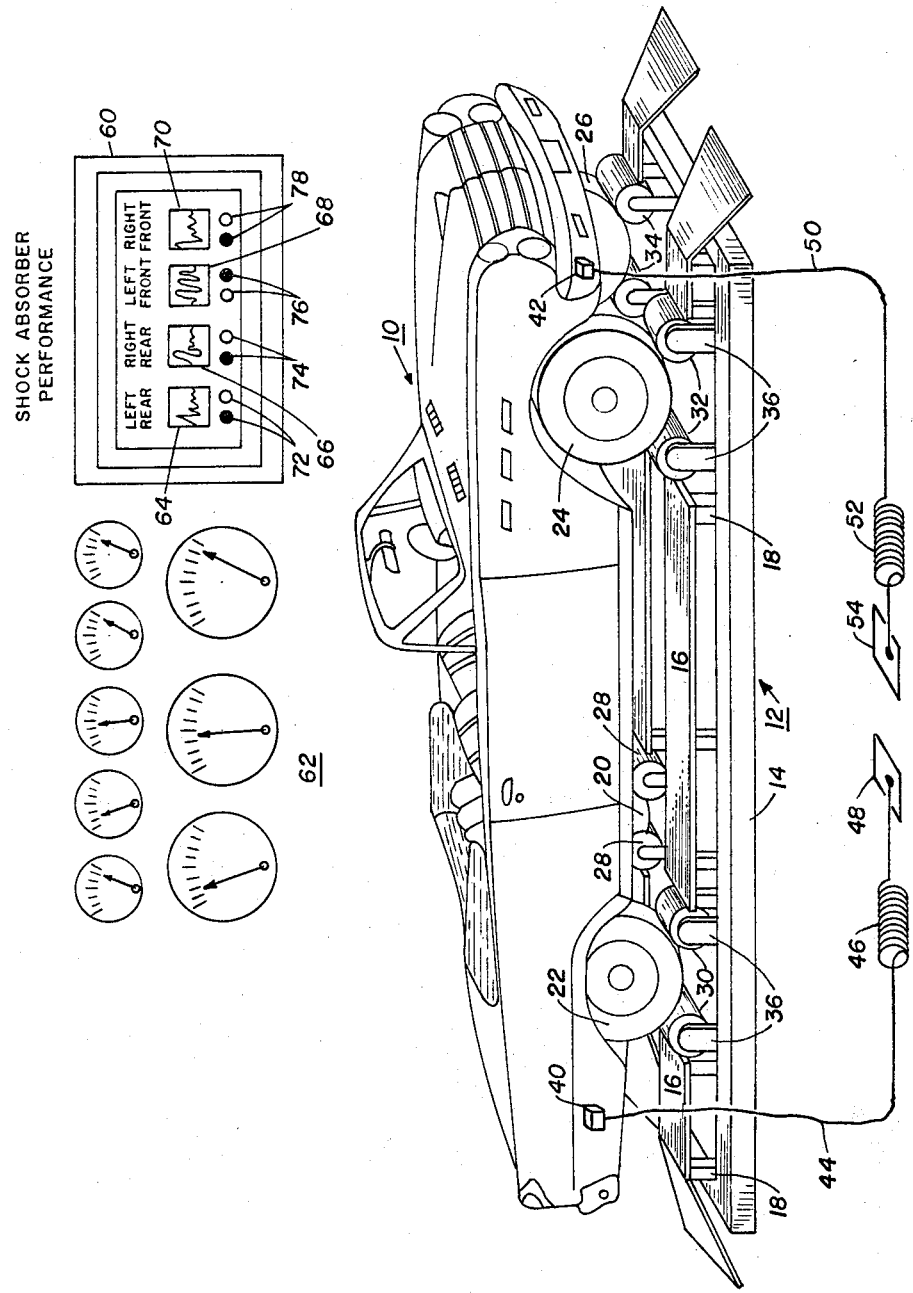

3,383,909
DYNAMIC SHOCK ABSORBER TESTER AND METHOD
Allan W. Percy, Crystal Lake, Ill., assignor to Union Oil Company of California, Los Angeles, Calif., a corporation of California
Filed Sept. 10, 1965, Ser. No. 486,365
6 Claims. (Cl. 73—119)

ABSTRACT OF THE DISCLOSURE

A method and apparatus for measuring the condition of automobile shock absorbers in which the condition of the shock absorber is determined by displaying on an oscilloscope an electrical signal proportional to the oscillations of the sprung weight of the vehicle produced by subjecting the unsprung weight of the vehicle to a shock, and summing the magnitude of these oscillations during a finite time period as measured by the time required for the oscilloscope sweep voltage to reach a set value.

---

This invention relates to a device and method of testing the mechanical efficiency of shock absorbers on wheeled vehicles particularly passenger cars and trucks. More particularly this invention provides a device which measures or indicates the dampening effect of one or more shock absorbers of a vehicle wherein the time function to establish equilibrium, after a shock is given to the spring suspension of the vehicle, is measured.

It is known in the art to use strain gauges as load stroke indicators in testing aircraft landing gears. Also the art teaches the application of an oscillating or serially intermittent shock movement to a wheel attached to a shock absorber in combination with means for indicating the motions of the sprung weight parts of the vehicle. Some of these testers take the form of purely mechanical testers employing torsion bars and a mechanical scriber to indicate the action of the wheel and the efficiency of the shock absorber.

All of these prior art devices and methods have the drawback of requiring repeated oscillation of the wheel which cyclic action does not give a fine indication of the dampening effect of the shock absorber, and secondly, no time is given by the apparatus to allow the system to come to equilibrium so that a true indication of the shock absorbers mechanical efficiency can be recorded. Lastly the prior art devices are not amenable to application to a modern car care center wherein by means of a chassis dynamometer the condition of many of the cars working parts can be simultaneously determined.

A feature of this invention is that the device and method are adapted to determine the condition of each shock absorber simultaneously as the vehicle is driven upon the dynamometer and no special or separate procedure is necessary to make these tests. By the use of the instant invention the operator of the dynamometer is given an instantaneous indication of the condition of the shock absorbers and this indication is presented to the vehicle owner in a clearly visible form which removes all doubt as to the true condition of the spring system of the vehicle.

Another feature of this invention is to provide a device and method for determining the performance of a shock absorber connected between the sprung and unsprung weight of a vehicle or machine which gives an accurate measurement of the time required for the shock absorber to reduce the amplitude of a single mechanical shock and reach equilibrium again.

Accordingly it becomes the primary object of this invention to provide a method of instantaneously evaluating the mechanical condition and efficiency of one or more shock absorbers of a vehicle.

Another object of this invention is to provide a device for instantaneously evaluating the mechanical condition and efficiency of one or more shock absorbers of a vehicle.

Still another object of this invention is to provide a method of evaluating the true mechanical condition of a shock absorber under conditions whereby the shock absorber is allowed to come to equilibrium after an impulse or mechanical shock so that its true dampening efficiency is evaluated and recorded and/or indicated or measured.

Another object of this invention is to provide a method and device for indicating and/or recording the time required for a shock absorber to function.

These and other objects of this invention will be described or become apparent as this description proceeds.

In the drawing automobile 10 is shown upon dynamometer 12 having base 14 supporting track 16 by means of supports 18. Each wheel 20, 22, 24, and 26 of car 10 is supported by a pair of dynamometer rolls 28, 30, 32 and 34 respectively, which are held in place by trunnions 36. The axis of rotation of each roller in its pair of trunnions is parallel to and horizontally spaced above the plane of track 16, a distance of about 2–4 inches. This amount of elevation of the rollers is adjustable and is sufficient to give each wheel a single sharp impact or bump as the wheels pass from the track 16 onto the rollers. The distance between each front and rear pair of rollers is adjustable to accommodate cars of different wheel base and the distance between the trunnions on any pair of rollers is adjustable to accommodate different tire sizes. Such adjustments are made prior to running the car on the dynamometer. Normally the device would be operated to determine the condition of the front wheels first or separately from the rear wheels of a four-wheeled vehicle.

Numerals 40 and 42 represent a linear accelerometer with means for attaching to the car. A permanent magnet on the back side of each linear accelerometer forms one means for easy attachment to any metallic part of the car. The use of a linear accelerometer avoids the necessity of a mechanical connection to a reference point to measure displacement or velocity. Linear accelerometer 40 is shown on the rear fender panel while linear accelerometer 42 is shown attached to the bumper. Lead 44 having coiled portion 46 connects from accelerometer 40 to floor plug 48. Similarly, accelerometer 42 has lead 50, coiled portion 52 and floor plug 54. A similar pair of accelerometers (not shown) would be connected to the left rear and left front of the car, each with similar conduits or electrical connections. Instead of a coiled portion 46 or 52, in the leads the conduits may be provided with other means for taking up slack, e.g., a spring actuated reel or the like.

Floor plugs 48 and 54, and also the corresponding outlets in the back or left side of the car are connected to a pick-up and multiple oscilloscope circuit having a front panel as illustrated at 60, shown mounted in the wall panel of the car test bay along with other gauges normally used with dynamometers as illustrated at 62. Panel 60 and its internal circuitry bears indicia of its function such as "Shock Absorber Performance" as illustrated and an oscilloscope for each shock absorber such as 64, 66, 68 and 70 corresponding to the "left rear," "right rear," "left front" and "right front" shock absorbers as illustrated. Beneath each oscilloscope is a pair of lights, 72, 74, 76 and 78, green for "good" and red for "bad," as a further indication of the performance of each shock absorber. To illustrate the panel shows all of the shock absorbers on the car 10 to be good except that one on the left front. The oscilloscope pattern on screen 68 shows several oscillations of the car on that side and the red light 76 is on.

This "good"-"bad" circuit can be a time-amplitude comparator wherein a time and acceleration amplitude envelope would be defined below which a shock absorber is considered "good" and above which it is "bad." This electrical time information is readily obtained from the oscilloscope sweep voltage which moves the trace across the screen. Electrical amplitude information or convenient voltage would be readily obtained, as it is known in the art, at the oscilloscope vertical plates. Circuitry to sense when the sweep voltage reaches a set reference voltage, indicating a specified time lapse since the start of the trace is incorporated between the oscilloscope and the lights. When this sweep voltage reaches the set reference voltage a secondary circuit therein is energized which compares the amplitude excursions with a second reference, giving a "good" indication when the maximum amplitude is less than the reference value, and a "bad" indication when it is greater.

The device of this invention is operated as follows. The four linear accelerometers i.e. 40 and 42 and those for the left-hand side of the car are attached to an area of the body near the individual wheels prior to driving the car on the dynamometer and the oscilloscope circuit within panel 60 is actuated. The car is then driven onto the dynamometer. As the wheels pass over the first of each pair of rollers they are suddenly raised and then drop into contact with the second of each pair of rollers. This gives each wheel one shock or impact. The spring suspension of the car responds and the shock absorber begins to function as the car body rises and falls. The accelerometers pick up each oscillation of the sprung weight of the car and the circuit 60 connects same into an oscilloscope picture as illustrated, both for the view of the operator of the dynamometer and the car owner.

The circuit is set so that if the dampening effect of the shock absorbers is normal the green light comes on and if less than a given minimum the red light comes on. Following this the balance of the dynamometer tests are conducted on the automobile.

In practice two determinations of the front wheel shock absorber efficiency can be made, one as the front wheels pass over rollers 30 and one as they pass over rollers 32. The car (which is illustrative of no particular model) can be backed off the dynamometer and another check of the shock absorber condition made. The dynamometer can be arranged as shown for use in a drive-through bay and similar double measurements made. One advantage in using magnets to hold the linear accelerometers to the metallic body parts is that they are easily placed on the car and easily removed, without damage to painted or chrome surfaces.

The pick-up and detection circuit for use in picking up the signal from the accelerometers 40 and 42 may take various forms known to the art and not part of this invention. Such a circuit utilizing strain-gage-based transducer sensitivity will require a low voltage, in the order of 5 to 20 volts DC regulated power supply to excite it. The circuit described briefly herein can operate on an 11 volt DC regulated power supply. One such power supply will suffice for all four accelerometers and the indicating circuit. However, its full scale output will be about 48 millivolts, which is the full vertical deflection of the scopes based on a 10 millivolt per division scale. Such a circuit eliminates the necessity of an amplifier. Accelerometers are available with a range of ±0.5, ±1.0, ±1.5, ±2.0 and ±2.5 gravity. For purposes of this invention an accelerometer with a sensitivity of about ±1.0 gravity can be used.

The oscilloscope for use in connection with said pick-up circuit can be any of monitor scope means or device adapted to take the signals from the accelerometers and transpose same into a meaningful signal. One illustrative instrument of relatively small size having a built-in trigger and sweep circuit, a sweep time up to 10 seconds full scale is the Model S-17-A oscilloscope formerly manufactured by Waterman Products Company, Inc. of Philadelphia, Pa., now known as Schaevitz-MCD. This instrument has a vertical sensitivity of 10 mv. peak to peak per screen division, a vertical D.C. amplifier circuit to provide direct reading in voltage and time of the observed signal. Such an instrument incorporates a rectangular faced cathode ray tube, a signal amplifier channel to amplify the impact signal by a known and calibrated multiple, a synchronization channel, linear sweep generator, horizontal amplifier channel, beam gate channel and power supply channel for all filament and plate voltages.

Linear accelerometers of various types and sensitivities are available for use in accordance with this invention. Instruments of this type employ the unbonded strain gage principle for measurement of both static and vibratory accelerations and may incorporate various means for internal damping, i.e. fluid-damping. A suitable and illustrative linear accelerometer, for purposes of this invention is the Model A4 (Spec. No. 15295) manufactured by Statham Instruments, Inc. of Los Angeles, Calif. and described in their bulletin AC3 of April 1965. This linear accelerometer has a range of ±0.25 g. to ±2.5 g., a rated excitation of 10 volts. ±4 mv. full scale output, 350 ohm resistance and the direction of sensitivity is parallel to the base. In mounting an instrument of this kind in the surface of the car body it should be placed so that its sensitive axis is within a few degrees of vertical. A small deviation from vertical would introduce a cosine error. This error is not very great up to 15°, i.e. 15°−cos 15°=0.966. Any accelerometer of this type having low response to transverse accelerations and high overload capability is suitable for purposes of this invention.

I claim:

1. A device for determining the performance of a shock absorber connected between the sprung weight and unsprung weight of a wheeled vehicle comprising a frame member, parallel spaced longitudinal wheel track members along the top of said frame members, at least one linear accelerometer adapted to be attached to the sprung weight of said vehicle with the direction of sensitivity thereof parallel to the direction of motion of said sprung weight, an oscilloscope connected to the output of said linear accelerometer, means to detect the sweep voltage of said oscilloscope to indicate the time lapse of the oscilloscope trace signal, means to compare the amplitude excursions of said trace and signal with a reference value and means to indicate when the maximum amplitude is less or greater than said reference value.

2. A method for determining the performance of a shock absorber connected between the sprung and unsprung weight of a vehicle, which comprises:
   subjecting said unsprung weight to a single mechanical shock to vertically displace said unsprung weight in relation to said sprung weight thereby causing vertical displacement of said sprung weight;
   translating the magnitude and direction of the vertical displacement of said sprung weight to a millivolt electrical signal;
   displaying said millivolt electrical signal on an oscilloscope screen to depict the magnitude and direction of the vertical displacement of said sprung weight, said oscilloscope generating a sweep voltage; and
   summing the amplitude of the displayed signal during the period required for the sweep voltage to reach a set value.

3. The method of claim 2 including the step of comparing the sum of the amplitude of said electrical signal during a finite time interval with a reference value to indicate the condition of the shock absorber under test.

4. Apparatus for determining the performance of a shock absorber connected between the sprung weight and unsprung weight of a vehicle, which comprises:

means for imparting a single mechanical shock to the unsprung weight of said vehicle to vertically displace said unsprung weight thereby causing said sprung weight to be vertically displaced;

means for transducing the magnitude and direction of the vertical displacement of said sprung weight to a millivolt electrical signal;

an oscilloscope adapted to receive said millivolt electrical output representing the magnitude and displacement of said sprung weight, said oscilloscope generating a sweep voltage;

means to detect said sweep voltage as a measure of time lapse, and means to accumulate the amplitude of said millivolt trace signal during the time required for the sweep voltage to reach a set value.

5. The apparatus defined in claim 4 wherein said means for transducing the magnitude and direction of the vertical displacement of said sprung weight is a linear accelerometer adapted for attachment to said sprung weight.

6. The apparatus defined in claim 4 including means to compare the accumulated value of the amplitude of the trace signal with a reference value and means to indicate whether the accumulated value is greater or less than said reference value.

References Cited

UNITED STATES PATENTS

| | | | |
|---|---|---|---|
| 923,397 | 6/1909 | Wood | 73—146 |
| 2,411,401 | 11/1946 | Welch | 73—71.2 X |
| 2,578,803 | 12/1951 | Holmberg et al. | 73—11 X |
| 2,643,869 | 6/1953 | Clark | 73—71.2 X |
| 2,709,362 | 5/1955 | Marcus et al. | 73—123 X |
| 3,138,959 | 6/1964 | Elam et al. | 73—401 |
| 3,164,003 | 1/1965 | Mac Millan | 73—11 |
| 3,266,302 | 8/1966 | Spangle et al. | 73—146 X |
| 3,313,142 | 4/1967 | Lackman | 73—11 |

OTHER REFERENCES

Instrument Practice 4(9): p. 472, July 1950, TA165166 copy in 73–71.2.

JAMES J. GILL, *Primary Examiner.*

RICHARD C. QUEISSER, *Examiner.*

J. W. MYRACLE, *Assistant Examiner.*